US011069218B2

(12) United States Patent
Hodge

(10) Patent No.: US 11,069,218 B2
(45) Date of Patent: Jul. 20, 2021

(54) SYSTEM FOR MONITORING OFFENDER DURING CORRECTIONAL SUPERVISORY PROGRAM

(71) Applicant: **GLOBAL TEL*LINK CORPORATION**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 16/791,682

(22) Filed: Feb. 14, 2020

(65) Prior Publication Data

US 2020/0234560 A1 Jul. 23, 2020

Related U.S. Application Data

(63) Continuation of application No. 15/997,203, filed on Jun. 4, 2018, now Pat. No. 10,565,851, which is a (Continued)

(51) Int. Cl.
*H04L 1/00* (2006.01)
*G08B 21/22* (2006.01)

(52) U.S. Cl.
CPC .................................... *G08B 21/22* (2013.01)

(58) Field of Classification Search
CPC .................................. H04L 1/00; H04M 1/00
See application file for complete search history.

(56) References Cited

U.S. PATENT DOCUMENTS 4,054,756 A 10/1977 Comella et al.
4,191,860 A 3/1980 Weber
(Continued)

OTHER PUBLICATIONS

"Bellcore Notes on the Networks (Formerly BOC Notes on the LEC Networks)," Bellcore, Special Report SR-2275, Issue 3, Dec. 1997.
(Continued)

*Primary Examiner* — Shirley Lu
(74) *Attorney, Agent, or Firm* — Sterne, Kessler, Goldstein & Fox P.L.L.C.

(57) ABSTRACT

The present disclosure provides details of a system for monitoring an offender during a correctional supervisory program. The system includes an offender communication device that transmit and receive communications via a communication and monitoring center. The offender communication device include a smart phone or tablet that obtains identity information including biometric information from an offender before a communication is transmitted or received. The offender communication device also stores data including metadata, metrics, or content of a communication and transmits the stored data to the communication and monitoring center. The communication and monitoring center transmits and receives communications from the offender communication device and another communication device. Further, the communication and monitoring center provides monitoring functionality to record a communication and determine that a location of an offender is in an authorized location based on rules and requirements of the correctional supervisory program.

13 Claims, 6 Drawing Sheets

Related U.S. Application Data continuation of application No. 15/371,525, filed on Dec. 7, 2016, now Pat. No. 9,990,826.

(56) References Cited

U.S. PATENT DOCUMENTS

| | | | |
|---|---|---|---|
| 4,933,966 | A | 6/1990 | Hird et al. |
| 4,935,956 | A | 6/1990 | Hellwarth et al. |
| 5,319,702 | A | 6/1994 | Kitchin et al. |
| 5,371,842 | A | 12/1994 | Easton et al. |
| 5,469,370 | A | 11/1995 | Ostrover et al. |
| 5,539,812 | A | 7/1996 | Kitchin et al. |
| 5,570,417 | A | 10/1996 | Byers |
| 5,655,013 | A | 8/1997 | Gainsboro |
| 5,768,355 | A | 6/1998 | Salibrici et al. |
| 5,778,313 | A | 7/1998 | Fougnies |
| 5,854,975 | A | 12/1998 | Fougnies et al. |
| 5,883,945 | A | 3/1999 | Richardson, Jr. et al. |
| 5,923,746 | A | 7/1999 | Baker et al. |
| 5,926,533 | A | 7/1999 | Gainsboro |
| 5,991,376 | A | 11/1999 | Hennessy et al. |
| 6,002,427 | A | 12/1999 | Kipust |
| 6,016,343 | A | 1/2000 | Hogan et al. |
| 6,052,454 | A | 4/2000 | Kek et al. |
| 6,570,970 | B2 | 5/2003 | Gruchala et al. |
| 6,636,591 | B1 | 10/2003 | Swope et al. |
| 6,639,977 | B1 | 10/2003 | Swope et al. |
| 6,647,096 | B1 | 11/2003 | Milliorn et al. |
| 6,668,045 | B1 | 12/2003 | Mow |
| 6,690,950 | B2 | 2/2004 | Takagi et al. |
| 6,728,345 | B2 | 4/2004 | Glowny et al. |
| 6,819,932 | B2 | 11/2004 | Allison et al. |
| 6,850,609 | B1 | 2/2005 | Schrage |
| 6,970,554 | B1 | 11/2005 | Peterson et al. |
| 7,005,993 | B2 | 2/2006 | Webb et al. |
| 7,046,779 | B2 | 5/2006 | Hesse |
| 7,076,031 | B1 | 7/2006 | Bress et al. |
| 7,079,636 | B1 | 7/2006 | McNiff et al. |
| 7,079,637 | B1 | 7/2006 | McNiff et al. |
| 7,106,843 | B1 | 9/2006 | Gainsboro et al. |
| 7,134,130 | B1 | 11/2006 | Thomas |
| 7,164,757 | B2 | 1/2007 | Link |
| 7,197,560 | B2 | 3/2007 | Caslin et al. |
| 7,256,816 | B2 | 8/2007 | Profanchik et al. |
| 7,333,798 | B2 | 2/2008 | Hodge |
| 7,496,345 | B1 | 2/2009 | Rae et al. |
| 7,505,406 | B1 | 3/2009 | Spadaro et al. |
| 7,529,357 | B1 | 5/2009 | Rae et al. |
| 7,551,732 | B2 | 6/2009 | Anders |
| 7,742,581 | B2 | 6/2010 | Hodge et al. |
| 7,742,582 | B2 | 6/2010 | Harper |
| 7,783,021 | B2 | 8/2010 | Hodge |
| 7,805,457 | B1 | 9/2010 | Viola et al. |
| 7,853,243 | B2 | 12/2010 | Hodge |
| 7,860,222 | B1 | 12/2010 | Sidler et al. |
| 7,881,446 | B1 | 2/2011 | Apple et al. |
| 7,899,167 | B1 | 3/2011 | Rae |
| 7,961,860 | B1 | 6/2011 | McFarlen |
| 7,965,821 | B2 | 6/2011 | Bouchard et al. |
| 8,014,800 | B2 | 9/2011 | Törnkvist |
| 8,098,804 | B1 | 1/2012 | Rae et al. |
| 8,135,115 | B1 | 3/2012 | Hogg, Jr. et al. |
| 8,180,028 | B1 | 5/2012 | Falcone et al. |
| 8,204,177 | B2 | 6/2012 | Harper |
| 8,351,593 | B2 | 1/2013 | Vick et al. |
| 8,428,559 | B2 | 4/2013 | Silva |
| 8,458,732 | B2 | 6/2013 | Hanna et al. |
| 8,488,756 | B2 | 7/2013 | Hodge et al. |
| 8,509,390 | B2 | 8/2013 | Harper |
| 8,577,003 | B2 | 11/2013 | Rae |
| 8,583,527 | B2 | 11/2013 | Polozola et al. |
| 8,626,118 | B2 | 1/2014 | Smith et al. |
| 8,644,466 | B1 | 2/2014 | Dawson |
| 8,855,280 | B1 | 10/2014 | Passe et al. |
| 8,976,949 | B2 | 3/2015 | Torgersrud et al. |
| 9,043,813 | B2 | 5/2015 | Hanna et al. |
| 9,077,680 | B2 | 7/2015 | Harper |
| 9,124,763 | B2 | 9/2015 | Humphries |
| 9,210,175 | B2 | 12/2015 | Gupta |
| 9,614,974 | B1 | 4/2017 | Hodge et al. |
| 9,692,889 | B2 | 6/2017 | Rokosky et al. |
| 9,990,826 | B1 | 6/2018 | Hodge |
| 10,565,851 | B2 | 2/2020 | Hodge |
| 2002/0067810 | A1 | 6/2002 | Barak et al. |
| 2002/0073207 | A1 | 6/2002 | Sidler et al. |
| 2002/0095296 | A1 | 7/2002 | Hind et al. |
| 2002/0095415 | A1 | 7/2002 | Walker et al. |
| 2002/0118798 | A1 | 8/2002 | Langhart et al. |
| 2002/0183040 | A1 | 12/2002 | Lundstrom et al. |
| 2002/0194096 | A1 | 12/2002 | Falcone et al. |
| 2003/0002639 | A1 | 1/2003 | Huie |
| 2003/0046083 | A1 | 3/2003 | Devinney, Jr. et al. |
| 2003/0086546 | A1 | 5/2003 | Falcone et al. |
| 2004/0058667 | A1 | 3/2004 | Pienmaki et al. |
| 2005/0094794 | A1 | 5/2005 | Creamer et al. |
| 2005/0102371 | A1 | 5/2005 | Aksu |
| 2005/0141678 | A1 | 6/2005 | Anders et al. |
| 2005/0207357 | A1 | 9/2005 | Koga |
| 2005/0259809 | A1 | 11/2005 | Hodge |
| 2006/0098796 | A1 | 5/2006 | Link |
| 2006/0149644 | A1 | 7/2006 | Salmar et al. |
| 2006/0285650 | A1 | 12/2006 | Hodge |
| 2006/0294043 | A1 | 12/2006 | Taisdeal |
| 2007/0071206 | A1 | 3/2007 | Gainsboro et al. |
| 2007/0133437 | A1 | 6/2007 | Wengrovitz et al. |
| 2007/0155411 | A1 | 7/2007 | Morrison |
| 2008/0012760 | A1 | 1/2008 | Derrick et al. |
| 2008/0023543 | A1 * | 1/2008 | Beisang .................... G07C 9/37 235/382 |
| 2009/0067587 | A1 | 3/2009 | Rokosky et al. |
| 2009/0254392 | A1 | 10/2009 | Zander |
| 2010/0299761 | A1 | 11/2010 | Shapiro |
| 2011/0247045 | A1 | 10/2011 | Rajagopal et al. |
| 2013/0179949 | A1 | 7/2013 | Shapiro |
| 2013/0279668 | A1 | 10/2013 | Rokosky et al. |
| 2013/0304581 | A1 | 11/2013 | Soroca et al. |
| 2013/0340028 | A1 | 12/2013 | Rajagopal et al. |
| 2014/0033230 | A1 | 1/2014 | Hanna et al. |
| 2014/0078242 | A1 * | 3/2014 | Onuma .................... H04N 7/15 348/14.08 |
| 2015/0188925 | A1 | 7/2015 | Gupta |
| 2015/0358457 | A1 | 12/2015 | Hodge |
| 2016/0028786 | A1 | 1/2016 | Hanna et al. |
| 2016/0103996 | A1 | 4/2016 | Salajegheh et al. |
| 2016/0163333 | A1 * | 6/2016 | Totzke .................... G06Q 10/10 704/235 |
| 2016/0165393 | A1 | 6/2016 | Pang |
| 2016/0191484 | A1 * | 6/2016 | Gongaware ............ G06Q 50/26 726/7 |
| 2016/0210607 | A1 | 7/2016 | Griffin |
| 2016/0248766 | A1 | 8/2016 | Tembey et al. |
| 2016/0309122 | A1 | 10/2016 | Kingery |
| 2018/0365966 | A1 | 12/2018 | Hodge |

OTHER PUBLICATIONS

"Cisco IAD2400 Series Business-Class Integrated Access Device", Cisco Systems Datasheet, 2003.
"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html.
"PacketCable™ Audio/Video Codecs Specification," Cable Television Laboratories, Inc., Ser. No. PKT-SP-CODEC-I05-040113 (2004).
"SIP and IPLinkTM in the Next Generation Network: An Overview," Intel, 2001.
"The AutoEDMS Document Management and Workflow System: An Overview of Key Features, Functions and Capabilities," ACS Software, May 2003.
"Voice Over Packet in Next Generation Networks: An Architectural Framework," Bellcore, Special Report SR-4717, Issue 1, Jan. 1999.
"Criminal Calls: A Review of the Bureau of Prisons' Management of Inmate Telephone. Privileges," U.S. Department of Justice, Office of the Inspector General, Aug. 1999.

(56) References Cited

OTHER PUBLICATIONS

"Why Can't You Make a Collect Call to a Cell Phone," National Public Radio, Jun. 30, 2008, Accessed via http://www.npr.org/templates/story/story.php?storyId=92021561 on Apr. 6, 2015.

1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.

1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.

Ahimovic et al., "Services for Tomorrow's PCS," IEEE International Conference on Universal Personal Communications, vol. 1, Oct. 12-15, 1993; pp. 222-227.

Appendices A-G of U.S. Appl. No. 60/377,763, filed May 3, 2002.

Assignment of U.S. Pat. No. 8,190,121 and U.S. Appl. No. 13/449,308.

Brown, et al., "SMS: The Short Message Service," Computer, vol. 40, No. 12, 2007.

BubbleLINK® Software Architecture (Science Dynamics 2003).

Bur Goode, Voice Over Internet Protocol (VoIP), Proceedings of the IEEE, vol. 90, No. 9, 1495-1517 (Sep. 2002).

Clifford J. Weinstein, MIT, The Experimental Integrated Switched Network—A System-Level Network Test Facility (IEEE 1983).

Commander Call Control System, Rev. 1.04 (Science Dynamics 2002).

Confalone et al., "Calling Card Service—TSPS Hardware, Software, and Signaling Implementation," The Bell System Technical Journal, Sep. 1982, vol. 61, No. 7; pp. 1675-1714.

Definition of "telephony", McGraw-Hill Dictionary of Scientific and Technical Terms, 6th Edition (McGraw-Hill, 2003).

Definitions of "Local Area Network (LAN)" and "Wide Area Network (WAN)," Microsoft Computer Dictionary (Microsoft Press 2002), pp. 304 and 561.

Excerpts from the Prosecution History of U.S. Appl. No. 10/135,878, filed Apr. 29, 2002.

File History of U.S. Pat. No. 6,636,591, U.S. Appl. No. 09/640,999, filed Aug. 17, 2000.

File History of U.S. Pat. No. 8,135,115, U.S. Appl. No. 11/603,938, filed Nov. 22, 2006.

File History of U.S. Pat. No. 8,190,121, U.S. Appl. No. 12/103,138, filed Apr. 15, 2008.

File History of U.S. Pat. No. 8,577,003, U.S. Appl. No. 13/009,483, filed Jan. 19, 2011.

File History of U.S. Pat. No. 8,626,118, U.S. Appl. No. 13/449,308, filed Apr. 17, 2012.

Reexamination U.S. Appl. No. 90/012,802 of U.S. Pat. No. 8,190,121, filed Mar. 1, 2013.

Fleischman, E., "Advanced Streaming Format (ASF) Specification," Microsoft Corporation (Jan. 9, 1998).

Garner, et al., "Mobile Terminated SMS Billing—Exploits and Security Analysis," IEEE International Conference on Information Technology: New Generations, 2006.

Jain, A., "An Introduction to Biometric Recognition," IEEE Transactions on Circuits and Systems for Video Technology, vol. 14, No. 1, Jan. 2004; pp. 4-20.

Jeff Hewett and Lee Dryburgh, Signaling System No. 7 (SS7/C7): Protocol, Architecture, and Services (Networking Technology) at 85 (Cisco Press, Jun. 2005).

Johnson, S., "An Environment for Treating Youthful Offenders," The Robert F. Kennedy Youth Center, Offender Rehabilitation, vol. 2, No. 2, 1977; pp. 159-172.

Joint Application, filed in *In re ASP GTEL Holdco, LLC*, No. 11-184 (Fed. Commc'ns. Comm'n. Oct. 28, 2011).

Joint Claim Construction and Prehearing Statement, Exhibit B: Securus' Intrinsic and Extrinsic Evidence Charts, *Global Tel*Link Corporation* v. *Securus Technologies, Inc.*, No. 3:14-cv-00829-K (N.D. Tex.), Sep. 26, 2014.

Kandel et al., "Rapid Educational Rehabilitation for Prison Inmates," Behaviour Research & Therapy, vol. 14, 1976; pp. 323-331.

Karacki et al., "Rewards in an Institution for Youthful Offenders," The Howard Journal of Penology and Crime Prevention, vol. XIII, No. 1, 1970; pp. 20-30.

Kozamernik, F., "Media Streaming over the Internet—an overview of delivery technologies," EBU Technical Review (Oct. 2002).

Liebling, "Incentives and Earned Privileges Revisited: Fairness, Discretion, and the Quality of Prison Life," Journal of Scandanavian Studies in Criminology and Crime. Prevention, vol. 9, 2008; pp. 25-41.

McKitterick et al., "State of the Art Review of Mobile Payment Technology," Department of Computer Science, Trinity College Dublin, 2003; 22 pages.

Microsoft Computer Dictionary, Fifth Edition, Microsoft Computer Press: Redmond, WA, 2002.

Newton, H., Newton's Telecom Dictionary (18th ed. 2002); p. 655.

Operator Service System Generic Requirements, OSSGR, TR-TSY-000271, Collect Billing, Rev. 3, Mar. 1988; 50 pages.

Osifchin, N., "A Telecommunications Buildings/Power Infrastructure in a New Era of Public Networking," IEEE 2000.

PacketCableTM 1.0 Architecture Framework Technical Report, PKT-TR-ARCH-V0 1-001201 (Cable Television Laboratories, Inc. 1999).

Pages from http://www.corp.att.com/history, archived by web.archive.org on Nov. 4, 2013.

Prosecution History of U.S. Appl. No. 11/005,816, filed Dec. 7, 2004.

Prosecution History of U.S. Appl. No. 11/045,589, filed Dec. 12, 2006.

Prosecution History of U.S. Appl. No. 11/562,842, filed Nov. 22, 2006.

Response to Office Action, filed Jan. 6, 2009, in Prosecution History of U.S. Appl. No. 10/642,532, filed Aug. 15, 2003.

Rey, R.F., ed., "Engineering and Operations in the Bell System," 2nd Edition, AT&T Bell Laboratories: Murray Hill, NJ, 1983.

Schwartz, et al., "How to Build an SMS Service," O'Reilly Short Cuts, 2007.

Science Dynamics, Inmate Telephone Control Systems, http://scidyn.com/fraudprev_main.htm (archived by web.archive.org on Jan. 12, 2001).

Science Dynamics, SciDyn BubbleLINK, http://www.scidyn.com/products/bubble.html (archived by web.archive.org on Jun. 18, 2006).

Science Dynamics, SciDyn Call Control Solutions: Commander II, http://www.scidyn.com/products/commander2.html (archived by web.archive.org on Jun. 18, 2006).

Science Dynamics, SciDyn IP Gateways, http://scidyn.com/products/ipgateways.html (archived by web.archive.org on Aug. 15, 2001).

Science Dynamics, Science Dynamics—IP Telephony, http://www.scidyn.com/iptelephony.maim.htm (archived by web.archive.org on Oct. 12, 2000).

Segal, D., "Phoning From Prison, at Prices Through the Roof," The New York Times, Feb. 1, 2014.

Shields, T., "Prison Phones Prove Captive Market for Private Equity," Bloomberg Business, Oct. 4, 2012.

Sundstrom, K., "Voice over IP: An Engineering Analysis," Master's Thesis, Department of Electrical and Computer Engineering, University of Manitoba, Sep. 1999.

The Line Information Database (LIDB) and Wireless Services, Telecordia Technologies White Paper, Dec. 2001; 31 pages.

U.S. Appl. No. 60/377,763, filed May 3, 2002.

U.S. Appl. No. 60/607,447, "IP-based telephony system and method," to Apple, et al., filed Sep. 3, 2004.

U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.

Valcourt, et al., "Investigating mobile payment: Supporting technologies, methods, and use," IEEE International Conference on Wireless and Mobile Computing, Networking, and Communications, 2005.

Walden, R., "Performance Trends for Analog-to-Digital Converters," IEEE Communications Magazine, Feb. 1999.

(56) References Cited

OTHER PUBLICATIONS

Waldon et al., The Industry Analysis Division's Reference Book of Rates, Price Indices, and Household Expenditures for Telephone Service, Mar. 1997; 167 pages.
Wireless Interconnection and Reciprocal Compensation Agreement Between Community Telephone Company and United States Cellular Corporation, Apr. 24, 2006; 29 pages.
Wormith, J.S., "The Development of a Prison Incentive System: A Case Illustration," Proceedings of the First Annual Corrections Research Forum, Ottawa Mar. 1989; pp. 77-93.
International Search Report and Written Opinion directed to related International Patent Application No. PCT/US17/64932, dated Jan. 5, 2018; 11 pages.
Definitions of "circuit switching" and "packet switching", Newton's Telecom Dictionary, 10th Edition, 1996; p. 253.
International Search Report and Written Opinion directed to related International Patent Application No. PCT/US17/59325, dated Jan. 26, 2018; 13 pages.

* cited by examiner

SYSTEM FOR MONITORING OFFENDER DURING CORRECTIONAL SUPERVISORY PROGRAM

CROSS-REFERENCE TO RELATED APPLICATIONS

This application is a continuation of U.S. patent application Ser. No. 15/997,203 filed on Jun. 4, 2018, which is a continuation of U.S. patent application Ser. No. 15/371,525 filed on Dec. 7, 2016 (now U.S. Pat. No. 9,990,826), each of which are incorporated by reference herein in their entirety.

BACKGROUND

Field

The disclosure relates to a system for monitoring offenders during correctional supervisory program.

Background

Most offenders go through a supervisory program(s) in which a series of steps are performed under supervision of a correctional system. Examples of these programs may include post sentencing pre-custody supervision, work release, pre-parole officer appointment, halfway house assignment, parole period required as a condition of release, or probation as a condition for release. These supervisory programs are designed to enhance public safety as well as improve the recidivism rates of offenders. Supervisory programs typically provide a very high level of supervision which include periodic visits to jurisdiction offices or calls to case officers.

Unfortunately, the lack of necessary resources in certain jurisdictions and the overwhelming number of cases dedicated to a parole officer or case officer places a heavy burden on them and negatively impacts the efficiency of the current supervision and monitoring system.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
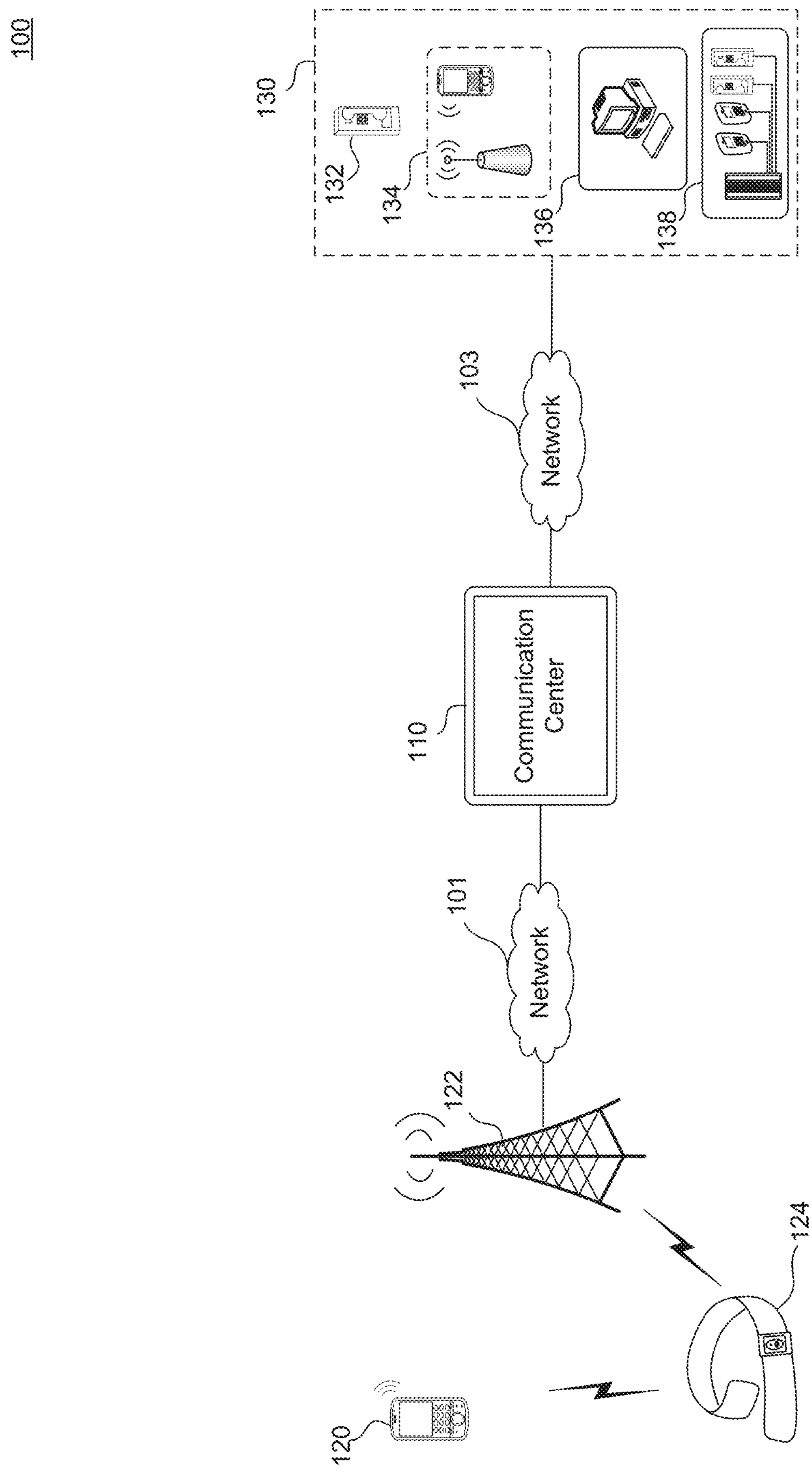
FIG. 1 illustrates a block diagram of a communication system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to “one exemplary embodiment,” “an exemplary embodiment,” “an example exemplary embodiment,” etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term “module” shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

Before offenders enter a controlled environment, such as a correctional facility or prison, or after offenders are released from the controlled environment, most go through a supervisory program(s) in which a series of steps are performed under supervision of a correctional system. Examples of these programs may include post sentencing pre-custody supervision, work release, pre-parole officer appointment, halfway house assignment, parole period required as a condition of release, or probation as a condition for release. These supervisory programs are designed to enhance public safety as well as improve the recidivism rates of offenders. The programs are tailored to increase an offender's accountability, provide restitution to the victim, provide rehabilitative needs for the offender, reduce the cost of punishment, or ensure that the scarce and costly prison cells are reserved for those from whom the public needs protection. The programs also provide jurisdictions with an alternative sentencing program to ease overcrowding of incarceration facilities. Mainly, the supervisory programs are focused on the efficient management of offenders within the community.

Typically, the supervisory programs provide a very high level of supervision including the monitoring of the offender, the enforcement of ordered probationary conditions, and the opportunity of self-improvement and rehabilitation. Offenders are usually required to make periodic visits to jurisdiction offices to report to their designated case officer. Having an offender make periodic visits to jurisdiction offices serves several purposes. The visits demonstrate the offender's ability to keep schedule, determine the location of the parolee, allow the officer to observe the look and demeanor of the offender, and allow for an opportunity for the offender to be tested for substance abuse. Most visits end with arranging a follow up appointment.

Unfortunately, the lack of necessary resources in certain jurisdictions and the overwhelming number of cases dedicated to a parole officer places a heavy burden on them and negatively impacts the efficiency of the current supervision and monitoring system. At times, officers may have a case load of as many as several hundred cases. Accordingly, the current system of officers personally supervising and monitoring offenders presents a number of challenges that are not sufficiently supported for efficient supervision and monitoring.

With these concerns in mind, it is preferable to implement a system for monitoring offenders during a correctional supervisory program for use by law enforcement personnel who are responsible for the monitoring and reporting of offenders that have been released on parole from a correctional facility, placed on probation, or ordered by a court to be monitored in some form.

Communication System

FIG. 1 illustrates a block diagram of communication system 100, according to embodiments of the present disclosure. As shown by FIG. 1, communication system 100 includes communication center 110 configured to receive and transmit communications between offender communication device 120 and communication device 130. In this disclosure, a communication refers one or more of an audio communication, a video communication, a text communication such as email, texting, or instant messaging, or a multimedia communication between two parties. The communication may be either a real-time communication or a non-real time communication. Communication center 110 is also configured to transmit instructions or commands to offender communication device 120 and to receive data in response to the transmitted instructions and commands, as described in further detail below.

Offender communication device 120 includes communication devices such as a smart phone or tablet issued to an offender during a supervisory process. Offender communication device 120 is a secured device having a tamper resistant cover as well as a locked down operating system. Offender communication device 120 is configured to allow jurisdictional control and monitoring of an offender via communication center 110.

Offender communication device 120 may be purchased or borrowed by the offender from a supervisory/correctional system, such as a correctional facility where the offender was located prior to a supervisory process. All communications between offender communication device 120 and outside communication device 130 are routed via communication center 110. Services for monitoring and recording communications from/to offender communication device 120 are also performed by communication center 110. Offender communication device 120 connects to the communication center 110 via network 101. The network 101 includes a Local-Area Network (LAN), a Wide-Area Network (WAN), or the Internet. In an embodiment, offender communication device 120 can also connect to network 101 via cellular tower 122.

In an embodiment, offender communication device 120 is configured to store communications, contacts, and/or browser history, report activity of the offender, and upload this data by transmitting one or more files, metrics, or metadata at various periods of time to communication center 120. This data includes information and/or content of outgoing and incoming communications as well as location data.

In an embodiment, offender communication device 120 is configured to store data such as contacts, call records, browser history, or other data from the offender's personal wireless device after sentencing for a period prior to incarceration or generated and/or purchased while the offender was incarcerated. Further, offender communication device 120 may be loaded with necessary support and supervision contact information such as parole or probation officer numbers or support groups and agencies that may assist the offender with the before and after incarceration processes. Support groups may include religious affiliations and/or approved family and friends. Offender communication device 120 may also be loaded with scheduling information including time and location for reporting to a case officer. In an embodiment, offender communication device 120 may be configured to backup this data on communication center 110.

Communication device 130 includes any and all devices such as a basic telephone 132, a wireless communication device 134, a work station 136, and/or audio or video communication devices 138, such as those in a prison. Communication device 130, such as wireless communication device 134, work station 136, and/or video communications device 138, is configured to include a camera and a video screen for generating and viewing a video. Communication device 130 connects to the communication center 110 via network 103, which may include any or all of a WAN, the Internet, and/or a Public Switched Telephone Network (PSTN).

In an embodiment, communication system 100 also includes tracking device 124, which may be a tracking monitor such as an ankle monitor or a tether commonly used by correctional systems for house arrest, or geo tracking. In general, tracking device 124 is configured to transmit location information to communication center 110 such that a location of an offender wearing tracking device 124 is tracked and monitored. As shown by FIG. 1, tracking device 124 is configured to transmit location information to communication center 110 by way of cellular tower 122 or offender communication device 120. Tracking device 124 is configured to communicate with cellular tower 122 through a wireless standard or protocol such as a third Generation Partnership Project (3GPP) Long Term Evolution (LTE) communications standard, a fourth generation (4G) mobile communications standard, or a third generation (3G) mobile communications standard, various networking protocols such as a Worldwide Interoperability for Microwave Access (WiMAX) communications standard or a Wi-Fi communications standard. Further, tracking device 124 is configured to communicate offender communication device 120 through any of the above mentioned wireless standard or protocol and/or wireless standards or protocols such as Bluetooth, Zigbee, or Z-wave.

Communication Center

Figure 2:
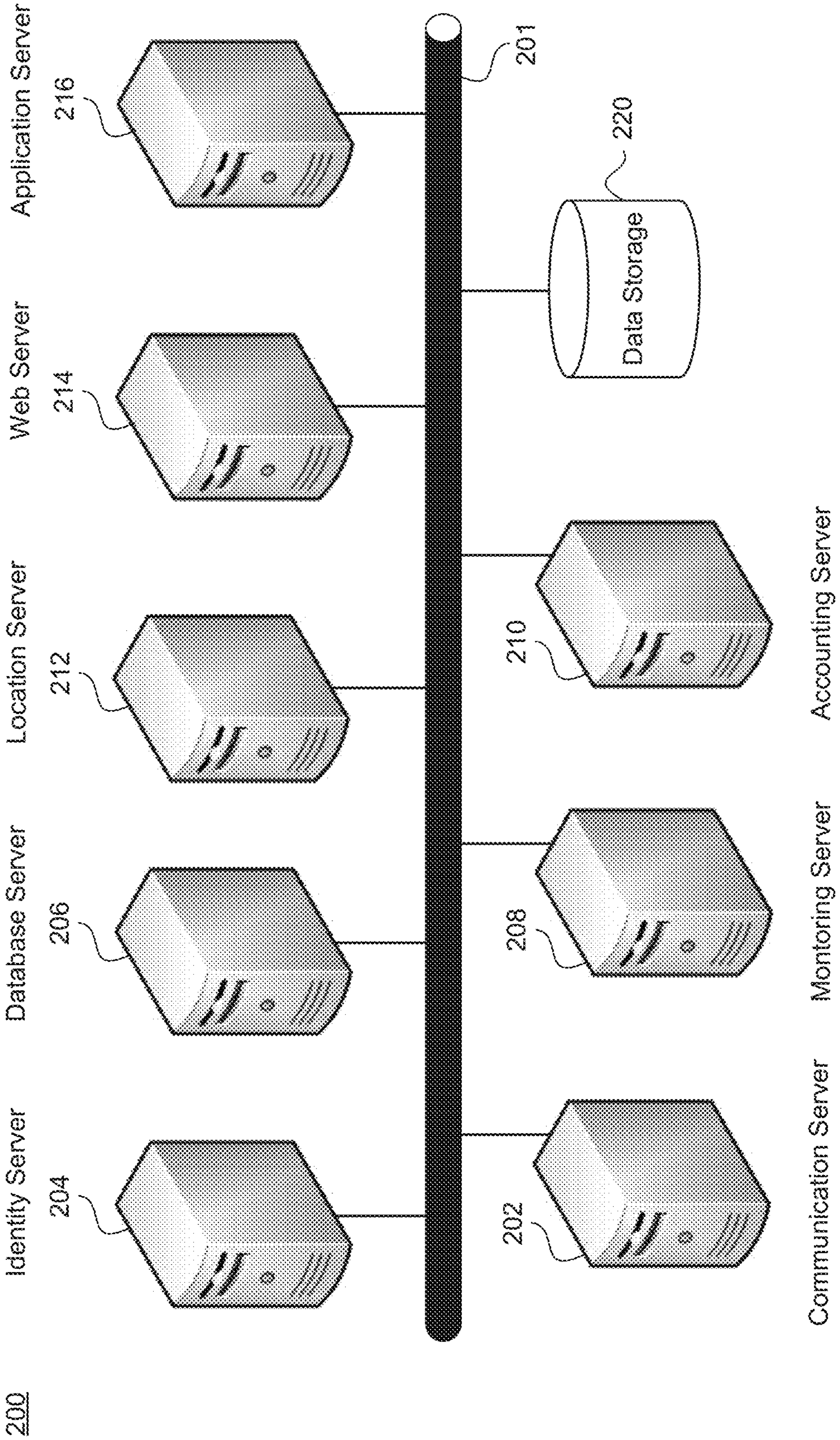
FIG. 2 illustrates a block diagram of a communication center, according to embodiments of the present disclosure.

FIG. 2 illustrates a block diagram of communication center 200, according to exemplary embodiments of the present disclosure. Communication center 200 may represent an exemplary embodiment of communication center 110 of FIG. 1. Communication center 200 includes communication server 202, identity server 204, database server 206, monitoring server 208, accounting server 210, location server 212, web server 214, application server 216, and data storage 220, that are all connected to each other via a network bus 201.

Each of these servers can be constructed as individual physical hardware devices, or as virtual servers. The number of physical hardware machines can be scaled to match the number of simultaneous user connections desired to be supported in communication system 100.

Communication server 202 consists of any number of servers, and is configured to receive and transmit communications and data from offender communication device 120 and outside communication device 130. Communication server 202 supports both real-time and non-real time communications. Communication server 202 is configured to perform switching required to electrically connect to a party, when receiving a communication, and connect to another party, when transmitting the communication.

Because there may be a variety of different communication standards employed by different audio, video, image, and text devices that wish to participate in communications, in an embodiment, communication server 202 may also perform format conversion of the communications. The conversion may convert incoming communications as needed, or may convert outgoing communications to be compatible with offender communication device 120, communication device 130, or monitoring server 208. For example, an audio communication may be generated using offender communication device 110, and may be listened to on the basic telephone 132.

Further, because communication server 202 receives and transmits communications by way of a network, in an exemplary embodiment, communication server 202 can decrypt received communications and encrypt communications prior to transmitting communications, for security purposes.

Identity server 204 consists of any number of servers, and is configured to collect and store identity data of offenders and users using communication system 100. Identity data includes at least one of username or password data, audio or voice data, fingerprint data, facial recognition data (2D or 3D), device data such as make and model of a communication device, or location data. Identity server 204 is further configured to facilitate a secure communication between parties receiving/transmitting a communication by performing identity verifications by comparing received information, such as at least one of username or password information, an audio or voice sample, a fingerprint sample, a facial recognition sample (2D or 3D), device information such as make and model of a communication device, or location information, from one of offender communication device 120 or communication device 130 with identity data.

Database server 206 consists of any number of servers, and is configured to store and organize data in a relational database. Database server 206 is configured to run a database management system, such as MYSQL™, to provide an example. Databases server 206 organizes the data such that respective identity data, accounting data, monitoring data, etc., are indexed and linked to allow communications and billing to organized in a relational manner.

Monitoring server 208 consists of any number of servers, and is configured to determine which communications should be monitored and transmits the communications to monitoring stations (not shown) for monitoring purposes. Further, monitoring server 208 is configured to record or store content of communications as files on an internal storage or an external storage, as will be explained in more detail below. Monitoring server 208 determines whether to have a communication monitored and/or store a communication based on an identity of the either party involved in the communication, a type of communication, and/or jurisdiction requirements. In an embodiment, monitoring server 208 can instruct offender communication device 120 to record a communication and have the recorded communication transmitted at a later time. In an embodiment, monitoring server 208 is configured to transmit a message to offender communication device 120 and/or communication device 130 to indicate that a communication is being recorded or monitored.

Further, monitoring server 208 is further configured to manage and schedule monitoring processes of an offender. Monitoring processes may include scheduling routine check-ins from an offender via offender communication device 120, requesting random check-ins of an offender via offender communication device 120, requesting audio or video samples from offender communication device 120, or monitoring communications from offender communication device 120. Monitoring server 208 is configured to transmit instructions to offender communication device 120 to perform these monitoring processes.

In an embodiment, monitoring server 208 is also configured to determine whether contents of a communication do not follow requirements of the supervisory program. In doing so monitoring server 208 is configured to scan text and/or convert audio to text to evaluate, based on the text, a prior actions or potentially future actions of the offender. Monitoring server 208 is configured to alert a case officer depending on the evaluation and/or data received from any of the servers and/or offender communication device 120.

Accounting server 210 consists of any number of servers, and is configured to perform accounting services for an offender using offender communication device 120 and for parties involved in a communication. Accounting server 210 is configured to receive payment information from offender communication device 120 or communication device 130, to generate and to organize billing data, and transmit the billing data to offender communication device 120 or communication device 130. Payments may be for participating in a communication or for purchases by way of offender communication device 120.

Location server 212 consists of any number of servers, and is configured to receive location and motion data from offender communication device 120. The location and motion data is used by location server 212 to determine a current or past location and/or motion of offender communication device 120. In an embodiment, location server 212 is configured to store permitted locations that an offender may be and verify that the offender is in the permitted location(s) per terms and requirements of the offender's correctional supervisory program. In an embodiment, location server 212 is also configured to corroborate a location of an offender based on the location and motion data received from both offender communication device 120 and tracking device 124. In an embodiment, location server 212 is configured to corroborate a location of the offender based on verifying biometric information such as an image, video, or audio sample from offender communication device 120, in coordination with identity server 204, to verify that the user is actually in a current location. In an embodiment, location server 212 is configured to transmit instructions to the offender communication device 120 to perform one or more of receiving location and motion data from tracking device 124, corroborating a current or past location of the offender with received data from tracking device 124, transmitting received data from tracking device 124 to location server 212, or transmitting corroborating information to location server 212. In an embodiment, location server 212 is configured to transmit information received and/or results of comparisons are sent to a case officer or administrator for review.

Web server 214 consists of any number of servers, and is configured to run web server software such as Apache and/or Microsoft Internet Information Server and/or an interactive voice response (IVR) server software. The primary function of web server 214 is to route requests and other communications from offender communication device 120 or communication device 130 to an appropriate destination within communication system 200. In an embodiment, web server 214 can also serve as a maintenance point into communication center 200, by which servicing, configuring, and updating can be performed. In an embodiment, the web server 214 is configured to provide managing services for generating communications, receiving instructions from a party to send or receive communications, and coordinating and scheduling the transmission of communications. For example, web server 214 can facilitate a party in generating a non-real time communication when the party uses a front-end application having a user interface.

Application server 216 consists of any number of servers, and functions as the primary logic processing center in communication center 200. Application server 216 is configured to manage and facilitate communication between servers, storage and devices, external to the communication center, such as offender communication device 120.

Data storage 220 provides access to a wide variety of data such as identification of parties involved transmitting and receiving communications, contents of communications, scheduling data, and/or any data stored by the servers. Because the data stored on data storage 220 may consume a significant amounts of storage space, data storage 220 may include a Network Attached Storage (NAS) device, which is configured as a mass storage device. In order to reduce the required size of data storage 220 preferably includes a backup routine to transfer data to permanent storage devices, such as archival permanent storage or optical disks, after a predetermined time has elapsed since the initial recording of that data.

Figure 3:
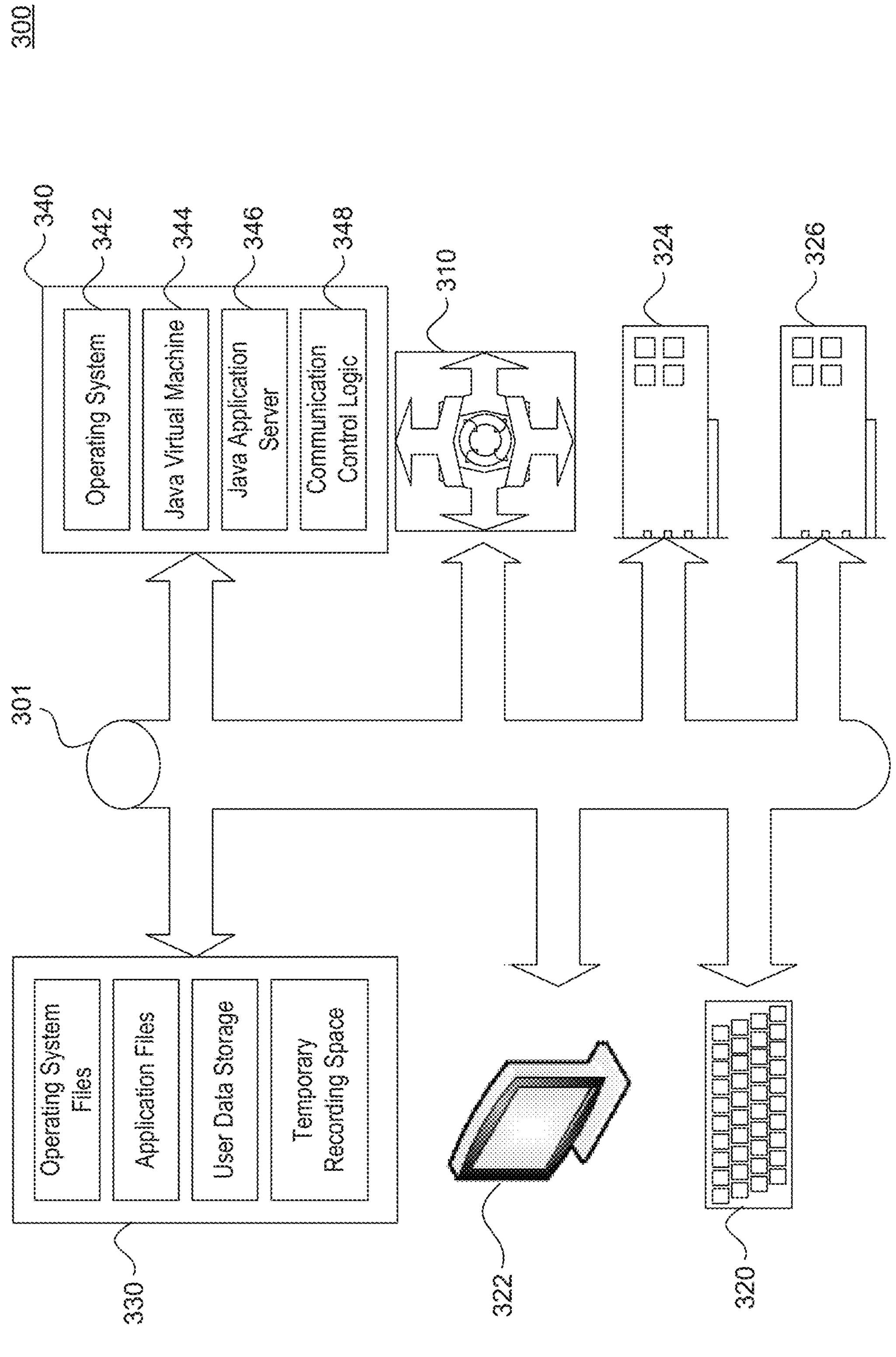
FIG. 3 illustrates a block diagram of an application server, according to embodiments of the present disclosure.

FIG. 3 illustrates application server 300, according to embodiments of the present disclosure. Application server 300 may represent an exemplary embodiment of application server 216 depicted in FIG. 2. Application server 300 consists of any number of servers, and functions as the primary logic processing center in communication system 100 or 200. Application server 300 is configured to manage and facilitate communication between servers and storage.

Application server 300 includes one or more central processing units (CPU) 310 connected via a bus 301 to several other peripherals. Such peripherals include an input device, such as keyboard and/or mouse 320, monitor 322 for displaying information, network interface card 324 and/or modem 326 that provides network connectivity and communication.

Application server 300 also includes internal data storage 330. Internal data storage 330 is non-volatile storage, such as one or more magnetic hard disk drives (HDDs) and/or one or more solid state drives (SSDs). Internal data storage 330 is used to store a variety of important files, documents, or other digital information, such as the operating system files, application files, user data, and/or temporary recording space.

Application server 300 also includes system memory 340, which is preferably faster and more efficient than internal data storage 330, and is configured as random access memory (RAM) in an embodiment. System memory 340 contains the runtime environment of application server 300, storing temporary data for any of operating system 342, java virtual machine 344, java application server 346, and communication control logic 348.

Mobile Device

Figure 4:
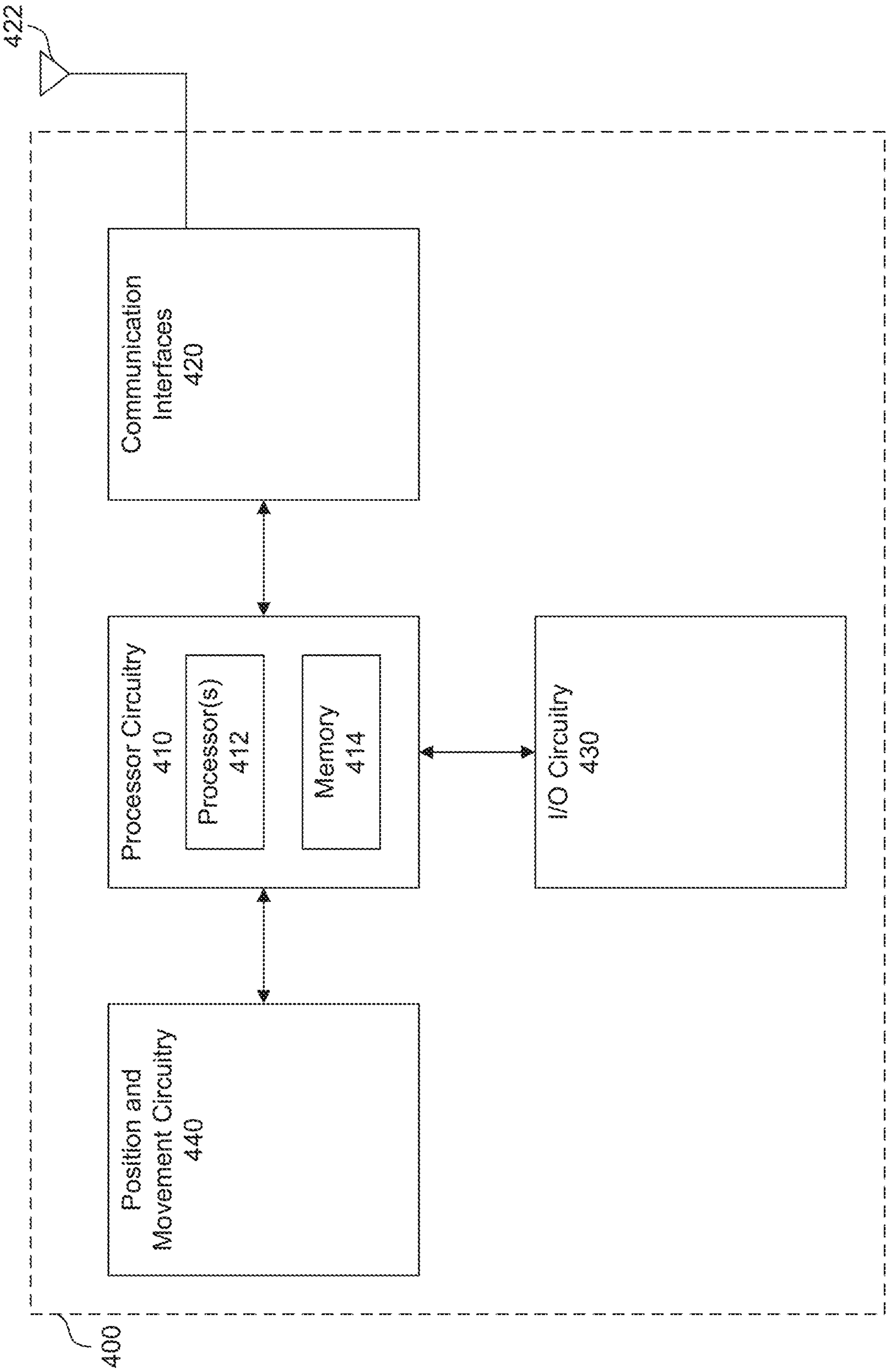
FIG. 4 illustrates a block diagram of a mobile device, according to embodiments of the present disclosure.

FIG. 4 illustrates a block diagram of mobile device 400, according to embodiments of the present disclosure. Mobile device 400 may be an exemplary embodiment of offender communication device 120. Mobile device 400 includes processor circuitry 410 that is communicatively coupled to plurality of communication interfaces 420, input/output (I/O) circuitry 430, and positional and motion circuitry 440. Processor circuitry 410 includes one or more processors 412, circuitry, and/or logic configured to control the overall operation of mobile device 400, including the operation of communication interfaces 420, I/O circuitry 430, and positional and motion circuitry 440. Processor circuitry 410 further includes memory 414 to store data and instructions. Memory 414 may be any well-known volatile and/or non-volatile memory that is removable and/or non-removable.

Communication interfaces 420 include one or more transceivers, transmitters, and/or receivers that communicate via one or more antennas 422. Communication interfaces 420 are configured to communicate according to one or more communication standards or protocols such as a 3GPP LTE communications standard, a 4G mobile communications standard, or a 3G mobile communications standard, various networking protocols such as a WiMAX communications standard or a Wi-Fi communications standard. Communication interfaces 420 are configured to transmit and receive communications between an offender and a user via a network, such as network 101.

In an embodiment, communication interfaces 420 are also configured to communicate with tracking device 124. In this embodiment communication interfaces 420 are configured to communicate with tracking device 124 by way of one or more of the above described standards and protocols or one or more of a wireless local area network (WLAN) standard, a near field communication (NFC) standard, a radio frequency identification (RFID) standard, infrared (IR) standard, Bluetooth, Zigbee, or Z-wave standard.

I/O circuitry 430 includes circuitry such as a keypad, a touch interface, a microphone, a camera, and/or a video screen for displaying information. I/O circuitry 430 may be used by a user for traditional mobile device communications such as audio, video, or texting communications. I/O circuitry 430 is also configured to capture audio samples, video samples, fingerprints, etc. for identity verifications.

Positional and motion sensors 440 include circuitry for determining a current location and a change in location of mobile device 400. Positional and motion circuitry 440 may include such circuitry as Global Positioning System (GPS) technology, indoor positioning systems (IPS) technology, accelerometers, and/or gyroscopes to determine position and motion. Positional and motion sensors 440 are configured to triangulate a first current location of mobile device 400 based on signals received from, for example, positioning systems. Positional and motion sensors 440 are configured to determine whether mobile device 400 is in motion based on second location of the mobile device 400 and determining whether a change of location occurred between the first current location and the second current location.

System Operations

Operations of monitoring an offender during a correctional supervisory program using communication system 100 of FIG. 1 will be described with respect to FIG. 5. Although the physical devices and components that form the system have largely already been described, additional details regarding their more nuanced operation will be described below with respect to FIGS. 1-4. While FIG. 5 contains an operation of monitoring an offender during a correctional supervisory program, the operation is not limited to the order described below, and various operations can be performed in a different order. Further, two or more operations of each method can be performed simultaneously with each other.

Figure 5:
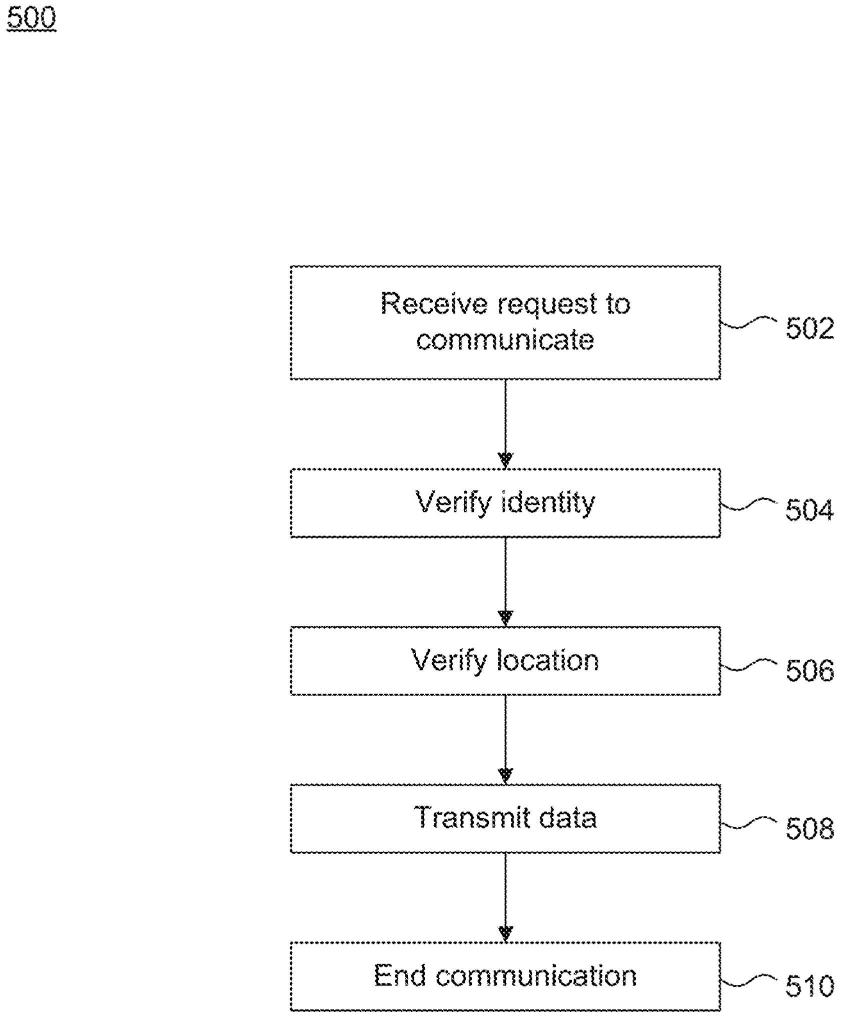
FIG. 5 illustrates a flowchart diagram of a method for monitoring an offender during a correctional supervisory program using communication system of FIG. 1, according to embodiments of the present disclosure.

FIG. 5 illustrates a flowchart diagram of a method 500 for monitoring an offender during a correctional supervisory program using communication system 100 of FIG. 1, according to embodiments of the present disclosure.

The communication system 100 provides communications between a variety of different devices. For starters, regardless of the communication type, all communications to/from offender communication device 120 are transported by way of the communication center 110.

A user interface such as a web site, the IVR, or another interface is managed by, or on behalf of, a correctional facility. The interface provides an interactive platform for users wanting to generate, transmit, and receive communications. Accordingly, the interface's backend links to or communicates with the application server 216 via the web server 214.

An operation of monitoring an offender during a correctional supervisory program starts when a user attempts to initiate a communication to or from offender communication device 120 (502). Examples of an attempt to initiate a communication includes an offender using offender communication device 120 attempting to initiate a phone or video call or to send a text or email to someone using communication device 130, or vice versa.

Once communication center 110 recognizes that an attempt has occurred, communication center 110 verifies access to communication system 100 (504). This is done by verifying an identity of a user(s) of offender communication device 120 and/or communication device 130. Identity verification is performed by verifying identity information of a user. Examples of the identity information include at least one of username or password information, an audio or voice sample, a fingerprint sample, a facial recognition sample (2D or 3D), device information such as make and model of a communication device, or location information. Offender communication device 120 and/or communication device 130. Communication center 110 receives and compares the identity information with identity data stored on identity server 204 to determine the identity of a user.

Next a location of the offender is verified (506). Verification of the offender's location may be performed by transmitting location information from the offender communication device 120, such as current or past GPS information, to communication center 110. In an embodiment, location server 212 verifies that the offender is in a permitted location per terms and requirements of the offender's correctional supervisory program. This may be done by comparing the location information with a designated perimeter that the offender is required to remain within. In an embodiment, location server 212 corroborates the location information by requesting biometric information from the offender, via offender communication device 120, to verify that the offender is actually in a current location. In an embodiment, location server 212 corroborates location information by comparing location In an embodiment, location server 212 corroborates the location information based a comparison of the location information from offender communication device 120 with location and motion data from tracking device 124.

Once communication center 110 has verified an identity of one or more of the users and a location of the offender, communication center 110 connects the offender communication device 120 and the communication device 130 together for a real time communication or transmits the non-real time (508). The monitoring server 208 records the communication, real time or non-real time communications, and provides the communication to a monitoring station (not shown) for review. During a real time communication, monitoring server 208 is configured to disconnect or interrupt the communication if determined that requirements of the offender's correctional supervisory program are not being followed. For example, the communication may be disrupted by monitoring server 208 when a reviewer or an officer determines that the offender is discussing a future crime. By allowing an offender to use offender communication device 120 according to embodiments of the present disclosure, the offender has access to a communication device that may be used by the offender to adapt to society and to have a point of contact in social and commercial settings. Thus, helping the offender to avoid recidivism.

Further, communication system 100 may allow an offender to live in areas and/or allow a wider geo fencing area that are not typically allowed by traditional tracking systems because offender communication device 120 is able to track communications by the offender, provides access to video chat or image recognition to confirm the offender's identity, and/or allow for confirmation of the offender's location. These benefits may also be realized due to the corroboration of data and additional monitoring aspects offered by communication system 100.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
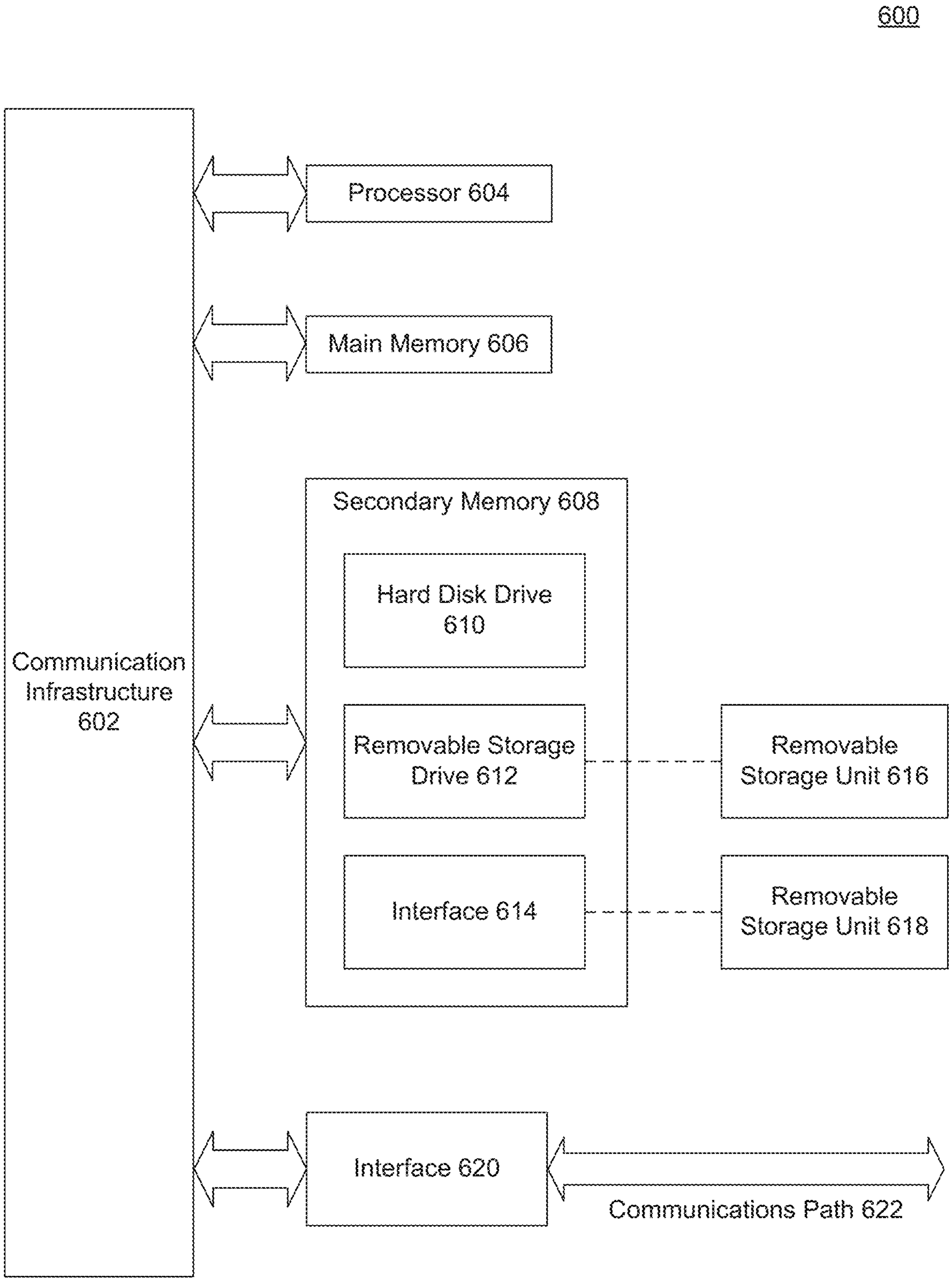
FIG. 6 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of FIG. 5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. An apparatus for remotely monitoring an offender, comprising:

one or more databases that stores identity data of the offender, an individual authorized to associate with the offender, and a region associated with the offender defining geographical locations at which the offender is permitted to be;

one or more processors configured to:

detect a communication attempt involving a wireless communication device assigned to the offender; and in response to the detecting of the communication attempt:

receive location information from the wireless communication device;

receive user identification information from the wireless communication device;

compare the received location information to the stored region;

determine, based on the comparing, whether a location of the wireless communication device is within the region based on the received location information;

identify the user based on the received user identification information; and connect or deny the communication attempt based on the determining and the identifying.

2. The apparatus of claim 1, wherein the one or more processors are further configured to receive second party contact information from the communication attempt.

3. The apparatus of claim 2, wherein the one or more processors are further configured to:

compare the received second party contact information to the stored individual authorized to associate with the offender; and connect or deny the communication attempt based on the comparing.

4. The apparatus of claim 1, wherein the received identification information includes biometric data.

5. The apparatus of claim 4, wherein to identify the user, the one or more processors are confiugred to:

analyze the biometric data;

compare the biometric data to the stored identity data; and determine whether the biometric data is a statistical match to the stored identity data based on the comparing.

6. The apparatus of claim 1, wherein the one or more processors are further configured to:

receive communication content data in response to connecting the communication attempt;

analyze the communication content data; and disconnect the communication based on the analyzing.

7. The apparatus of claim 6, wherein to analyze the communication content data, the one or more processors are configured to:

perform speech recognition on the received communication content data to generate a communication transcript; and review the transcript for prohibited keywords.

8. A method for processing communication attempts by an offender, the method comprising:

storing identity data and an authorized region associated with the offender that defines geographical locations at which the offender is permitted to be;

detecting a communication attempt involving a wireless communication device assigned to the offender;

receiving location information from the wireless communication device;

receiving user identification information from the wireless communication device;

comparing the received location information to the stored region;

determining, based on the comparing, whether a location of the wireless communication device is within the authorized region based on the received location information;

identifying the user based on the received user identification information;

connecting or denying the communication attempt based on at least one of the determining or the identifying.

9. The method of claim 8, further comprising extracting second party contact information from the communication attempt.

10. The method of claim 9, further comprising:

storing an authorized individual with which the offender is permitted to communicate;

comparing the received second party contact information to the stored authorized individual; and connecting or denying the communication attempt based on the comparing.

11. The method of claim 8, wherein the received identification information includes biometric data.

12. The method of claim 11, further comprising:

analyzing the biometric data;

comparing the biometric data to the stored identity data; and determining whether the biometric data is a statistical match to the stored identity data based on the comparing.

13. The method of claim 8, further comprising:

receiving communication content data in response to the connecting the communication attempt;

generating a transcript of the communication based on the communication content data; and reviewing the transcript for prohibited keywords.

* * * * *